(12) United States Patent
Lu et al.

(10) Patent No.: US 11,549,495 B2
(45) Date of Patent: Jan. 10, 2023

(54) POWER GENERATION MODEL BASED ON A TRANSCRITICAL CYCLE WITH AN INCREASING-PRESSURE ENDOTHERMIC PROCESS USING CO2-BASED MIXTURE WORKING FLUIDS FOR AN ENHANCED GEOTHERMAL SYSTEM

(71) Applicant: Tianjin University, Tianjin (CN)

(72) Inventors: Xinli Lu, Tianjin (CN); Changyou Geng, Tianjin (CN); Wei Zhang, Tianjin (CN); Jiaqi Zhang, Tianjin (CN); Hao Yu, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 17/337,225

(22) Filed: Jun. 2, 2021

(65) Prior Publication Data

US 2022/0082091 A1    Mar. 17, 2022

(30) Foreign Application Priority Data

Sep. 16, 2020    (CN) .......................... 202010970807.3

(51) Int. Cl.
*F03G 7/04*    (2006.01)
*F24T 50/00*    (2018.01)
(Continued)

(52) U.S. Cl.
CPC .............. *F03G 7/04* (2013.01); *F01K 25/065* (2013.01); *F01K 25/103* (2013.01); *F03G 4/001* (2021.08);
(Continued)

(58) Field of Classification Search
CPC . F03G 7/04; F03G 4/029; F03G 4/001; F03G 4/035; F24T 50/00; F01K 25/103; F01K 25/065; Y02E 10/10
(Continued)

(56) References Cited

U.S. PATENT DOCUMENTS 6,668,554 B1    12/2003    Brown
2011/0100002 A1    5/2011    Muir et al.
(Continued)

FOREIGN PATENT DOCUMENTS

CN    103045173 A    4/2013
CN    203655374 U    6/2014
(Continued)

*Primary Examiner* — Hoang M Nguyen
(74) *Attorney, Agent, or Firm* — Davis Wright Tremaine, LLP

(57) ABSTRACT

It is provided a power generation model based on a transcritical cycle with an increasing-pressure endothermic process using $CO_2$-based mixture working fluids for an enhanced geothermal system, including a geothermal water circulation, a mixture working fluid circulation and a cooling water circulation. A coaxial pipe-in-pipe downhole heat exchanger is provided in the mixture working fluid circulation. Innovations are reflected in that an increasing-pressure endothermic process is achieved due to making use of gravity and hence increase a heat quantity absorbed in a cycle, thereby improving power generation quantity of the cycle; and a binary mixture working fluid composed of $CO_2$ and an organic working fluid is adopted to realize a transcritical power cycle with an increasing-pressure endothermic process and a decreasing-temperature exothermic process, thereby effectively reducing irreversibility of a heat transfer between a working fluid and a heat source and improving power cycle efficiency.

7 Claims, 8 Drawing Sheets

(51) Int. Cl.
  *F03G 4/00* (2006.01)
  *F01K 25/06* (2006.01)
  *F01K 25/10* (2006.01)

(52) U.S. Cl.
  CPC ............. *F03G 4/029* (2021.08); *F03G 4/035* (2021.08); *F24T 50/00* (2018.05); *Y02E 10/10* (2013.01)

(58) Field of Classification Search
  USPC .............................................. 60/641.2–641.4
  See application file for complete search history.

(56) References Cited

U.S. PATENT DOCUMENTS

| | | | | |
|---|---|---|---|---|
| 2012/0261091 | A1* | 10/2012 | Krecke | F24F 12/006 165/45 |
| 2015/0121868 | A1* | 5/2015 | Fryrear | F03G 7/04 60/641.4 |
| 2016/0169211 | A1* | 6/2016 | Tahara | F03G 7/04 60/641.2 |
| 2017/0299226 | A1* | 10/2017 | Buscheck | F24T 10/20 |
| 2020/0362214 | A1* | 11/2020 | Poole | C09K 5/045 |
| 2021/0270498 | A1* | 9/2021 | Ma | F25B 9/008 |

FOREIGN PATENT DOCUMENTS

| | | | |
|---|---|---|---|
| CN | 112065521 A | 12/2020 | |
| CN | 112632875 A | 4/2021 | |
| CN | 113027713 A | 6/2021 | |

\* cited by examiner

Temperature of geothermal water is 120℃.

Temperature of geothermal water is 180℃.

Temperature of geothermal water is 120°C.

Temperature of geothermal water is 180°C.

(b)

POWER GENERATION MODEL BASED ON A TRANSCRITICAL CYCLE WITH AN INCREASING-PRESSURE ENDOTHERMIC PROCESS USING CO2-BASED MIXTURE WORKING FLUIDS FOR AN ENHANCED GEOTHERMAL SYSTEM

CROSS REFERENCE TO RELATED APPLICATION

This patent application claims the priority and benefit of Chinese Patent Application No. 202010970807.3 entitled "Hot-Dry-Rock Geothermal Power Generation Model Based on a Transcritical Cycle with an Increasing-Pressure Endothermic Process Using $CO_2$-Based Mixture Working Fluids" filed with the Chinese Patent Office on Sep. 16, 2020, which is incorporated by reference herein in its entirely.

TECHNICAL FIELD

The present disclosure relates to the field of energy application technology, relates to the technology application of converting geothermal energy into mechanical energy, and in particular to a power generation model based on a transcritical cycle with an increasing-pressure endothermic process using $CO_2$-based mixture working fluids for an enhanced geothermal system.

BACKGROUND ART

At present, energy conversation and emission reduction are important objects developed and supported by a state. A medium-and-low temperature power generation technology is one of hot spots under study, and is also a direction of industrialization. For medium-and-low temperature geothermal energy, its energy utilization efficiency is not high because its energy grade is low. At present, how to use medium-and-low temperature geothermal resource more effectively becomes a major international research direction.

Medium-and-low temperature geothermal resources are mainly applied in the fields of power generation, industrial processing, heating, greenhouse, etc. In terms of medium-and-low temperature geothermal power generation, methods of generating electricity mainly include ORC (Organic Rankine Cycle) and TRC (Transcritical Rankine Cycle). During an endothermic process of the Transcritical Rankine Cycle, a working fluid undergoes an increasing-temperature process; compared with an ordinary ORC, a temperature change of the working fluid has a better match with that of a heat source. Furthermore, $CO_2$ has good mobility and excellent heat transfer performance, and is considered to be an ideal working fluid for underground heat extraction. A density of $CO_2$ varies greatly with a temperature. Adopting $CO_2$ as a heat extraction working fluid in a geothermal well can cause a buoyancy-driven thermosiphon effect, thereby reducing power consumption of a circulation pump.

However, pure $CO_2$ working fluid completely driven by the thermosiphon effect, generally maintains merely a small circulating flowrate, and thus, the heat taken from the geothermal well is constrained by a flowrate of $CO_2$. In addition, because a critical temperature of $CO_2$ is low, a supercritical $CO_2$ Brayton cycle is usually used for power generation. A cooling system of the $CO_2$ Brayton cycle is restricted by use of costly large-area coolers. A conventional compact condenser cannot be used because there is no phase change. When a Brayton cycle is adopted, a turbine outlet pressure of $CO_2$ tends to be above a critical pressure, and the power cycle efficiency is further limited. Therefore, there is a need to develop a new thermodynamic cycle and system for power generation using enhanced geothermal fluids.

SUMMARY

An object of some embodiments is to overcome disadvantages of the prior art, and to provide a power generation model based on a transcritical cycle with an increasing-pressure endothermic process using $CO_2$-based mixture working fluids for an enhanced geothermal system. The power generation model is a new thermodynamic cycle for converting geothermal energy into mechanical energy. Innovations of the proposed geothermal power generation model are reflected by the following aspects: a coaxial pipe-in-pipe downhole heat exchanger is adopted to achieve an increasing-pressure endothermic process through gravity field so as to increase heat quantity absorbed in a power cycle, thereby improving power output of the power cycle; and a binary mixture working fluid composed of $CO_2$ and an organic working fluid is adopted to realize a transcritical cycle with an increasing-pressure endothermic process and a decreasing-temperature exothermic process, thereby effectively reducing irreversibility of heat transfer between the working fluid and a heat source, and hence improving efficiency of the power cycle.

The present disclosure adopts the following technical solutions to solve the technical problem.

It is provided a power generation model based on a transcritical cycle with an increasing-pressure endothermic process using $CO_2$-based mixture working fluids for an enhanced geothermal system, including a geothermal water circulation, a mixture working fluid circulation and a cooling water circulation. A coaxial pipe-in-pipe downhole heat exchanger is provided in the mixture working fluid circulation. The mixture working fluid circulation adopts a binary mixture composed of $CO_2$ and an organic working fluid as a power cycle working fluid. The power cycle working fluid includes (but is not limited to) $CO_2$/R32, $CO_2$/R1270, $CO_2$/R161, $CO_2$/R1234yf, $CO_2$/R134a, $CO_2$/R152a, and $CO_2$/R1234ze.

Furthermore, a mixing ratio of the mixture working fluid is within a range of 0.1 to 0.9. An injection pressure is within a range of 10 MPa to 18 MPa. A mass flowrate of the working fluid is within a range of 1 kg/s to 10 kg/s.

Furthermore, the above geothermal power generation model is based on a transcritical cycle with an increasing-pressure endothermic process using $CO_2$-based mixture working fluids for an enhanced geothermal system. The system includes a geothermal production well, a coaxial pipe-in-pipe downhole heat exchanger, a turbine, a condenser, a working fluid pump, a geothermal water injection pump and a geothermal water reinjection well. The coaxial pipe-in-pipe downhole heat exchanger is provided in the geothermal production well. An outlet of the coaxial pipe-in-pipe downhole heat exchanger is connected to an inlet of the turbine. An outlet of the turbine is connected to an inlet of the condenser, and an outlet of the condenser is connected to an inlet of the working fluid pump. An outlet of the working fluid pump is connected to an inlet of the coaxial pipe-in-pipe downhole heat exchanger. An outlet of the geothermal production well is connected to an inlet of the geothermal water injection pump. An outlet of the geothermal water injection pump is connected to an inlet of the geothermal water reinjection well.

Furthermore, the inlet of the condenser includes a mixture working fluid inlet and a cooling water inlet. The outlet of the condenser includes a mixture working fluid outlet and a cooling water outlet. The outlet of the turbine is connected to the mixture working fluid inlet of the condenser, and the mixture working fluid outlet of the condenser is connected to an inlet of the working fluid pump.

Furthermore, the condenser is connected to an external cooling device.

Furthermore, the external cooling device is a cooling tower.

The present disclosure includes the following advantages and positive effects:

1. Innovation of the present disclosure is reflected in that a mixture working fluid is used to achieve a transcritical cycle including an increasing-pressure endothermic process and a decreasing-temperature exothermic process by using a coaxial pipe-in-pipe downhole heat exchanger, in which the mixture working fluid circulation adopts a binary mixture composed of $CO_2$ and an organic working fluid as a power cycle working fluid. The power cycle working fluid includes $CO_2$/R32, $CO_2$/R1270, $CO_2$/R161, $CO_2$/R1234yf, $CO_2$/R134a, $CO_2$/R152a, and $CO_2$/R1234ze. A mixing ratio of the mixture working fluid is within a range of 0.1 to 0.9. An injection pressure is within a range of 10 MPa to 18 MPa. A mass flowrate of the working fluid is within a range of 1 kg/s to 10 kg/s. Selection of a non-CO2 working fluid takes into account thermophysical property, stability, toxicity, flammability, environmental friendliness and price.

2. A power generation cycle according to the present disclosure adopts a $CO_2$-based mixture working fluid, which can improve efficiency of a power cycle and facilitate reducing investment for a cooling system. Since a critical point of the mixture working fluid is higher than a critical point of pure $CO_2$, a condensation process with a phase change can be realized. Therefore, the system can still use a conventional condenser, and is not necessarily limited to use of a costly large-area cooler as in a $CO_2$ Brayton cycle, thereby saving corresponding investment. In addition, a decreasing-temperature exothermic process has a better match with a temperature change of a sink (cooling water), and thus can reduce a heat transfer temperature difference, thereby reducing heat transfer irreversibility and improving power cycle efficiency.

3. The system of the present disclosure adopts a coaxial pipe-in-pipe downhole heat exchanger and realizes an increasing-pressure endothermic process by making use of gravitational potential energy, so as to increase a heat quantity absorbed in the power cycle and improve a power output of the power cycle. In addition, a difference in gravity between a downward flow and an upward flow may generate a buoyancy-driven thermosiphon effect, resulting in that a working fluid pressure at an outlet of the downhole heat exchanger is not less than but more than that at an inlet of the downhole heat exchanger, thereby effectively, reducing power consumption of a circulation pump. The heat quantity absorbed in the power cycle can be increased and the power cycle efficiency can be improved. The power cycle working fluid, in the coaxial pipe-in-pipe downhole heat exchanger, can absorb heat from deeper geothermal water with a higher temperature, thereby achieving an effect of increasing a temperature of the working fluid at an outlet of the downhole heat exchanger. Furthermore, the power cycle is transcritical and has an increasing-pressure endothermic process and a decreasing-temperature exothermic process, which has a better match with a temperature change of a heat source (geothermal fluid), a heat transfer temperature difference between the power cycle working fluid and the heat source can be reduced, thereby reducing heat transfer irreversibility and improving efficiency of the power cycle.

4. The present disclosure proposes a power generation model with a new thermodynamic cycle suitable for an enhanced geothermal system. The heat exchanger is a coaxial pipe-in-pipe heat exchanger placed in a geothermal production well. The power cycle working fluid adopts a binary mixture of $CO_2$ and an organic working fluid. The binary mixture working fluid is injected into the coaxial pipe-in-pipe heat exchanger through a pressurized pump to obtain heat from upward-flowing geothermal water in the production well. The coaxial pipe-in-pipe heat exchanger is composed of an inner pipe and an outer pipe. The mixture working fluid is injected through an annulus formed between the inner pipe and the outer pipe to form an annular downward flow, and an increasing-pressure endothermic process is achieved due to gravity. After a heat transfer between the geothermal fluid and the mixture working fluid is completed, the mixture working fluid flows through a bottom of the heat exchanger, and then flows upward along the inner pipe, out of the inner pipe, then into the turbine to generate shaft work. The turbine exhaust enters the condenser to release heat and is condensed. The present model is mainly directed to using hot-dry-rock geothermal resources, but is not limited thereto. The model is also suitable for geothermal power generation under the conditions when other binary cycle geothermal power generation systems apply. Mechanical energy of a turbine can be used directly as mechanical energy, and can also be converted into electrical energy by a power generation device.

BRIEF DESCRIPTION OF THE DRAWINGS

FIGS. 2A and 2B are structural schematic diagrams of a geothermal power generation system according to the present disclosure, in which FIG. 2A is a schematic diagram with a marked inlet and a marked outlet, and FIG. 2B is a schematic diagram with marked thermodynamic states corresponding to a temperature-entropy (T-s) curve in FIG.

DETAILED DESCRIPTION OF THE EMBODIMENTS

Hereinafter, the present disclosure will be further described in detail by way of specific embodiments in combination with the accompanying drawings, and the following embodiments are merely illustrative, are not limited, and the protection scope of the present disclosure is not limited thereto.

It is provided a power generation model based on a transcritical cycle with an increasing-pressure endothermic process using $CO_2$-based mixture working fluids for an enhanced geothermal system, including a geothermal water circulation, a mixture working fluid circulation and a cooling water circulation. For the mixture working fluid circulation, a transcritical cycle including an increasing-pressure endothermic process and a decreasing-temperature exothermic process is innovatively achieved through a coaxial pipe-in-pipe downhole heat exchanger by adopting the mixture working fluid. The schematic diagram of a heat transfer model of the coaxial pipe-in-pipe downhole heat exchanger is shown in FIG. 1.

Figure 1:
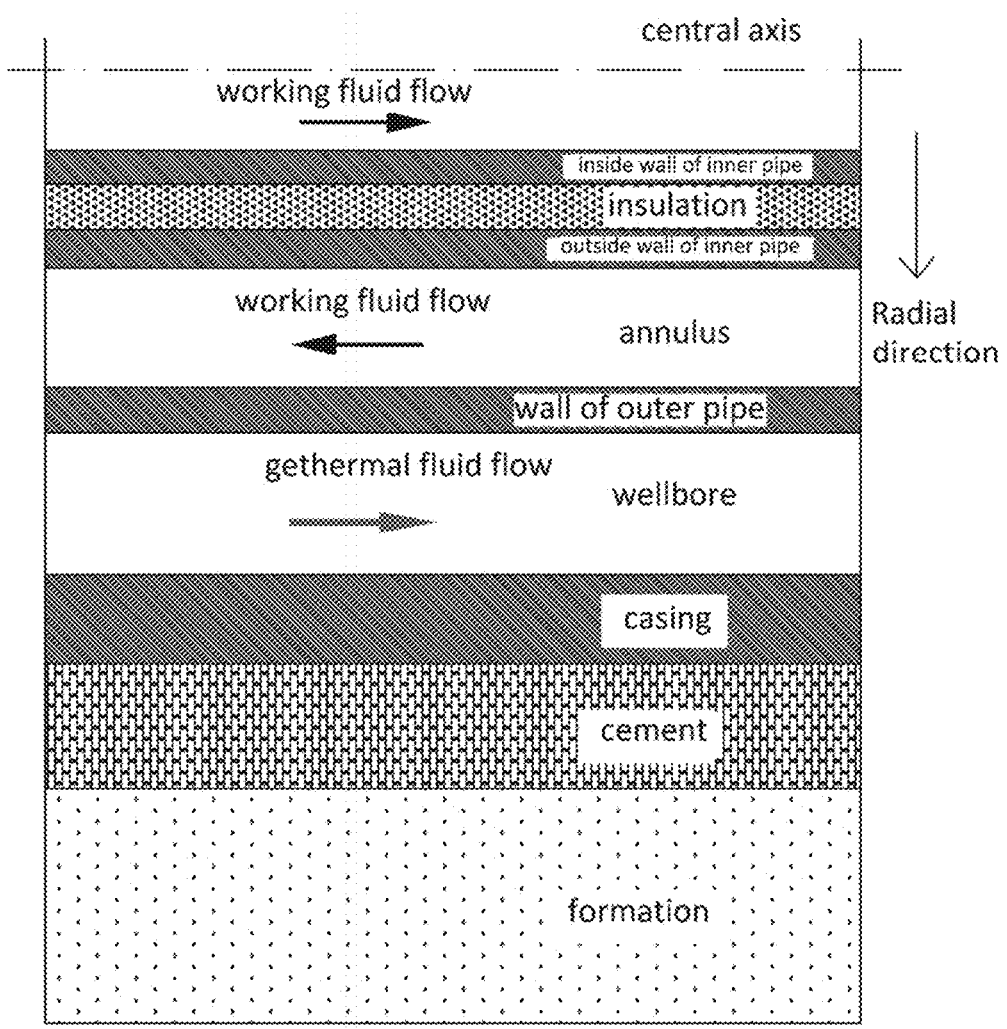
FIG. 1 is a schematic diagram of a heat transfer model of a coaxial pipe-in-pipe downhole heat exchanger, according to the present disclosure.

In FIG. 1, the mixture working fluid circulation adopts a binary mixture composed of $CO_2$ and an organic working fluid, as a power cycle working fluid. The power cycle working fluids include $CO_2$/R32, $CO_2$/R1270, $CO_2$/R161, $CO_2$/R1234yf, $CO_2$/R134a, $CO_2$/R152a, and $CO_2$/R1234ze.

A mixing ratio of the mixture working fluid is within a range of 0.1 to 0,9. An injection pressure is within a range of 10 MPa to 18 MPa. A mass flowrate of the working fluid is within a range of 1 kg/s to 10 kg/s.

Figure 2A:
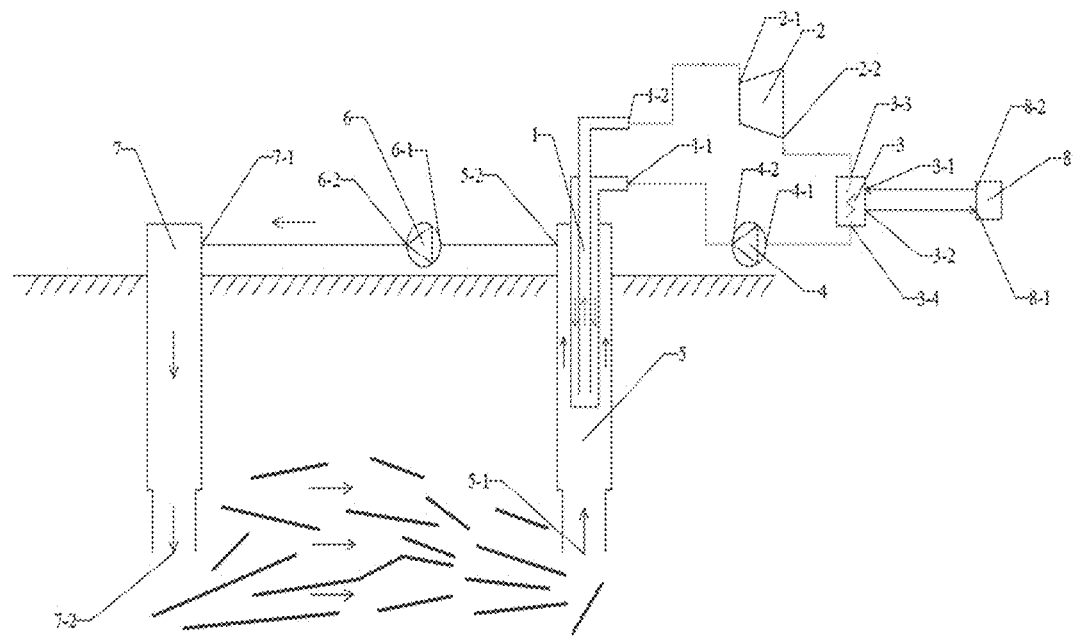

The above geothermal power generation model is based on a transcritical cycle with an increasing-pressure endothermic process using $CO_2$-based mixture working fluids for an enhanced geothermal system. As shown in FIG. 2, the geothermal power generation model includes a coaxial pipe-in-pipe downhole heat exchanger 1, a turbine 2, a condenser 3, a working fluid pump 4, a geothermal production well 5, a geothermal water injection pump 6, a geothermal water reinjection well 7 and a cooling device 8. The coaxial pipe-in-pipe downhole heat exchanger includes a heat-exchanger mixture-working-fluid inlet 1-1 and a heat-exchanger mixture-working-fluid outlet 1-2. The turbine includes a turbine mixture-working-fluid inlet 2-1 and a turbine mixture-working-fluid outlet 2-2. The condenser includes a condenser cooling-water inlet 3-1, a condenser cooling-water outlet 3-2, a condenser mixture-working-fluid inlet 3-3 and a condenser mixture-working-fluid outlet 3-4. The working fluid pump includes a working-fluid-pump mixture-working-fluid inlet 4-1 and a working-fluid-pump mixture-working-fluid outlet 4-2. The geothermal water production well includes a geothermal water inlet 5-1 and a geothermal water outlet 5-2. The geothermal water injection pump includes an injection-pump geothermal-water inlet 6-1 and an injection-pump geothermal-water outlet 6-2. The geothermal water reinjection well includes a reinjection well inlet 7-1 and a reinjection well outlet 7-2. The cooling device includes a cooling water inlet 8-1 and a cooling water outlet 8-2. The cooling device in this embodiment is a cooling tower.

The heat-exchanger mixture-working-fluid outlet 1-2 is connected with the turbine mixture-working-fluid inlet 2-1. The turbine mixture-working-fluid outlet 2-2 is connected with the condenser mixture-working-fluid inlet 3-3. The condenser mixture-working-fluid outlet 3-4 is connected with the working-fluid-pump mixture-working-fluid inlet 4-1. The working-fluid-pump mixture-working-fluid outlet 4-2 is connected with the heat-exchanger mixture-working-fluid inlet 1-1. The production well outlet 5-2 is connected with the injection-pump geothermal-water inlet 6-1. The injection-pump geothermal-water outlet 6-2 is connected with the reinjection well inlet 7-1. The cooling water inlet 8-1 is connected with the condenser cooling-water outlet 3-2. The cooling water outlet 8-2 is connected with the condenser cooling-water inlet 3-1.

A working process is as follows.

(1) Geothermal water circulation (heat source)

Geothermal water flows from the geothermal water inlet 5-1 of the production well into the geothermal production well 5 to release heat, and flows out from the geothermal water outlet 5-2 of the production well into the geothermal water injection pump 6, then flows into the reinjection well 7, from the reinjection well outlet 7-2 into an engineered geothermal reservoir to absorb heat, and then flows into the production well 5 from the geothermal water inlet 5-1 of the production well to form a geothermal water circulation.

(2) Mixture working fluid circulation

The power cycle adopts the binary mixture working fluid composed of $CO_2$ and an organic working fluid. The mixture working fluid is pressurized by the working fluid pump 4 to a pressure higher than a critical pressure of the power cycle working fluid, and is injected into the coaxial pipe-in-pipe heat exchanger 1 from the mixture-working-fluid inlet 1-1 thereof. The injected mixture working fluid forms an annular downward flow between an outside wall of the inner pipe and an inside wall of the outer pipe, which implements an increasing-pressure endothermic process due to gravity, and obtains heat from an upward-flowing geothermal water in the production well. After the heat transfer is completed, the mixture working fluid flows out from a bottom of the heat exchanger and then flows upward through the inner pipe, out from the heat-exchanger mixture-working-fluid outlet 1-2, and into the turbine 2 through the turbine mixture-working-fluid inlet 2-1 to do work. The turbine exhaust flows out from the turbine mixture-working-fluid outlet 2-2, into the condenser 3 through the condenser mixture-working-fluid inlet 3-3 to release heat and be condensed to a saturated liquid state. The condensed working fluid flows out from the condenser mixture-working-fluid outlet 3-4, into the working fluid pump 4 through the working-fluid-pump mixture-working-fluid inlet 4-1 to be pressurized to a pressure higher than a critical pressure of the power cycle working fluid, and then flows out from the working-fluid-pump mixture-working-fluid outlet 4-2, through the heat-exchanger mixture-working-fluid inlet 1-1, into the coaxial pipe-in-pipe downhole heat exchanger 1 again for heat transfer, thereby firming a mixture working fluid circulation.

(3) Cooling water circulation (cold source)

The cooling water flows out of the cooling device (cooling tower) 8 from the cooling water outlet 8-2, into the condenser 3 through the condenser cooling-water inlet 3-1, and absorbs heat in the condenser, then flows out from the condenser cooling-water outlet 3-2, and then returns to the cooling device 8 through the cooling water inlet 8-1. The cooled cooling water flows out of the cooling device 8 from the cooling water outlet 8-2 and into the condenser 3 again, thereby forming cooling water circulation.

The system can implement four necessary processes of a thermal power generation cycle, that is, a compression process, a heat absorption process, an expansion (doing work) process, and a heat release process. The power cycle using the mixture working fluid generates shaft work through the turbine which drives a generator to produce electricity.

The present disclosure adopts a binary mixture working fluid based on $CO_2$, and a selection for another non-$CO_2$ working fluid takes into account thermophysical property, stability, toxicity, flammability, environmental friendliness and price of the working fluid. Temperature glide of the mixture is also a key point to be considered in the selection of a working fluid. It is not the better as the temperature glide is greater. Once the temperature glide exceeds a certain level, high concentration shift and fractionation of the mixture components can appear. Taking these factors into account, the following mixture working fluids are selected: $CO_2$/R32, $CO_2$/R1270, $CO_2$/R161, $CO_2$/R1234yf, $CO_2$/R134a, $CO_2$/R152a, and $CO_2$/R1234ze. Data relative to physical properties, safety and environmental friendliness of the organic working fluids used in the model are shown in Table 1.

centric and coaxial, a three-dimensional heat transfer model is simplified as a radially symmetric heat transfer model. A heat transfer process includes the following portions: heat transfer between the inner pipe and the outer pipe in the downhole heat exchanger, heat transfer between the outer pipe and the geothermal water, heat transfer between the geothermal water and the formation, and heat transfer process in the formation. The present disclosure has performed simulation calculations for the above models, and the basic data used in the simulation calculations is shown in Table 2.

TABLE 2

Basic Parameters of Simulation Model

| Parameters | Values |
|---|---|
| Isentropic turbine efficiency | 0.75 |
| Isentropic pump efficiency | 0.80 |
| Pinch point temperature difference of condenser (° C.) | 10 |
| Temperature at cooling water inlet(° C.) | 18 |
| Inner diameter of wellbore (m) | 0.215 |
| Outer diameter of wellbore (m) | 0.380 |
| Inner diameter of inner pipe of downhole heat exchanger (m) | 0.073 |
| Outer diameter of inner pipe of downhole heat exchanger (m) | 0.089 |
| Inner diameter of annulus of downhole heat exchanger (m) | 0.120 |
| Outer diameter of annulus of downhole heat exchanger (m) | 0.138 |
| Formation density (kg/m3) | 2650 |
| Specific heat capacity of formation [J/(kg · ° C.)] | 837 |
| Thermal conductivity of casing [W/(m · ° C.)] | 30 |
| Thermal conductivity of formation [W/(m · ° C.)] | 2.5 |
| Thermal conductivity of heat insulating layer [W/(m · ° C.)] | 0.02 |
| Thermal conductivity of cement [W/(m · ° C.)] | 0.72 |

The simulation calculation is based on the following assumption.

TABLE 1

Data relative to physical properties, safety and environmental friendliness of the used organic working fluids in the model

| Working fluid | Molar mass | Boiling temperature (° C.) | Critical temperature (° C.) | Critical pressure (MPa) | OEL (PPMv) | LEL (%) | ASHRAE 34 safety group | Atmospheric life(yr) | ODP | GWP |
|---|---|---|---|---|---|---|---|---|---|---|
| R32 | 52.02 | 51.7 | 78.1 | 5.78 | 1000 | 14.1 | A2 | 4.9 | 0 | 675 |
| R1270 | 42.08 | 47.7 | 92.4 | 4.66 | 660 | 2.0 | A3 | 0.001 | 0 | ~20 |
| R161 | 48.06 | 37.6 | 102.2 | 5.09 | — | 3.8 | — | 0.21 | 0 | 12 |
| R1234yf | 114.04 | 29.5 | 94.7 | 3.38 | 500 | 6.2 | A2L | 0.029 | 0 | <4.4 |
| R134a | 102.03 | 26.1 | 101.1 | 4.06 | 1000 | None | A1 | 14.0 | 0 | 1370 |
| R152a | 66.05 | 24.0 | 113.3 | 4.52 | 1000 | 4.8 | A2 | 1.4 | 0 | 124 |
| R1234ze | 114.04 | 19.0 | 109.4 | 3.64 | 1000 | 7.6 | e | 0.045 | 0 | 6 |

Figure 2B:
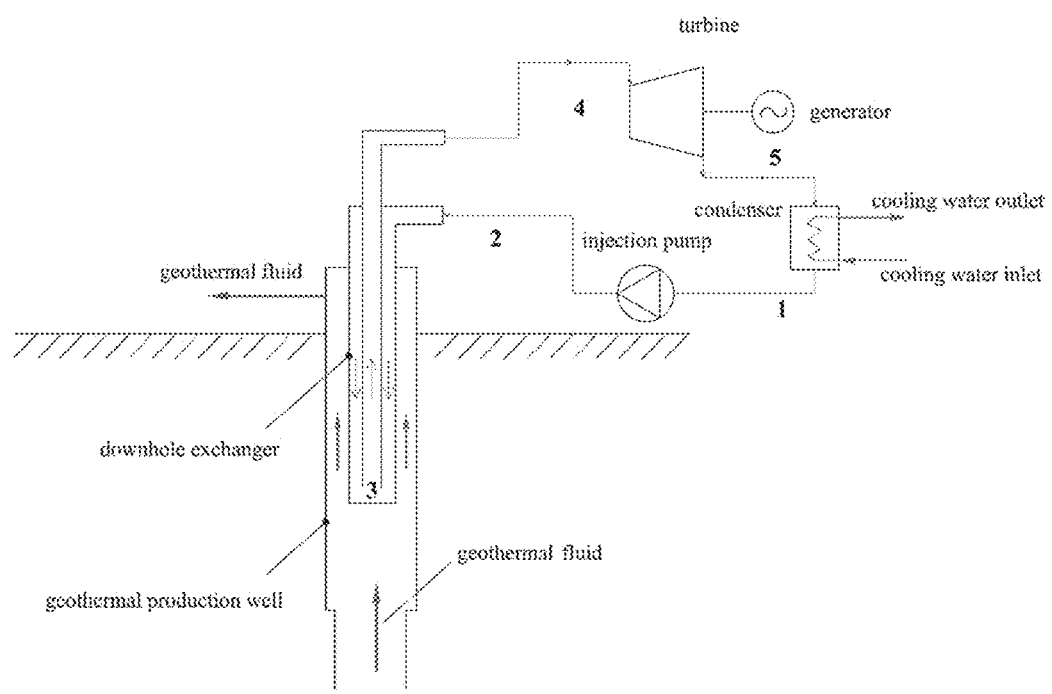
Figure 3:
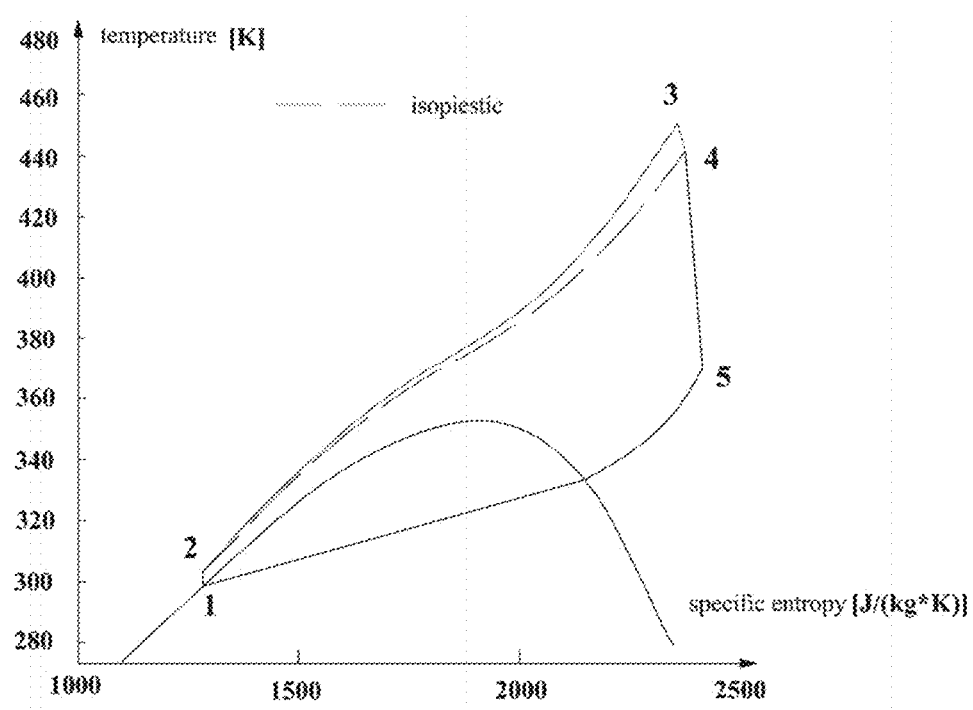
FIG. 3 is a temperature-entropy (T-s) curve diagram of a power cycle according to the present disclosure.

FIG. 3 is a temperature-entropy (Ts) curve diagram showing a power cycle according to the present disclosure, in which each state point corresponds to that in FIG. 2B, The mixture working fluid undergoes the following thermodynamic processes: an expansion (doing work) process (4-5) in the turbine, a decreasing-temperature exothermic process (5-1) in the condenser, a pressurization process (1-2) in the working fluid injection pump, an increasing-pressure endothermic process (2-3) in the coaxial pipe-in-pipe downhole heat exchanger, and a near-adiabatic flow process (3-4) in the inner pipe of the downhole heat exchanger. Condensing pressure is dependent on a cooling water temperature and a pinch point temperature difference. Due to the temperature glide of the mixture during the condensation process, a problem of the pinch point temperature difference is alleviated; therefore, the heat utilization efficiency is improved.

Since the coaxial pipe-in-pipe downhole heat exchanger and the geothermal well in the present disclosure are con- (1) The power generation system under a steady-state condition is assumed.

(2) Except for the downhole heat exchanger, abrasion and heat losses in the pipes and the condenser are ignored.

(3) The mixture working fluid is in a saturated liquid state at the condenser outlet.

(4) The mixture working fluid is pressurized to a pressure higher than its supercritical pressure before it is injected into the downhole heat exchanger.

(5) Temperature of geothermal water at the bottom of the downhole heat exchanger and a pressure of the geothermal water at a wellhead are set as boundary conditions of the geothermal water.

1. Turbine

An expansion (doing work) process (process 4-5 in FIG. 3) of the working fluid in the turbine is determined by expressions (1) and (2), and an exhaust gas state at the turbine outlet is determined by a condensing pressure and efficiency of the turbine:

$$W_T = m(h_4 - h_5) \tag{1}$$

$$\eta_T = (h_4 - h_5)/(h_4 - h_5) \tag{2}$$

2. Condenser

The working fluid from the turbine enters the condenser and is condensed to a saturated liquid state (process 5-1 in FIG. 3). Because the cycle uses the mixture working fluid, a temperature glide occurs (a condensation process is a decreasing-temperature exothermic process), so that a temperature change of the working fluid in the condensation process has a better match with a temperature change of the cooling water, and hence reduce irreversible loss in the heat transfer. The condensing pressure is determined by a cooling water temperature and a pinch point temperature difference. Energy balance relationship in the condenser is as follows:

$$Q_C = m(h_5 - h_1) \tag{3}$$

$$m_{CW} = m(h_{C,pinch} - h_5)/(h_{CW,pinch} - h_{CW,in}) \tag{4}$$

3. Injection Pump

The condensed working fluid is pressurized to a pressure higher than a supercritical pressure (process 1-2 in FIG. 3)

$$W_P = m(h_2 - h_1) \tag{5}$$

$$\eta_P = (h_2 - h_1)/(h_2 - h_1) \tag{6}$$

4. Coaxial Pipe-In-Pipe Downhole Heat Exchanger

In a numerical simulation of the downhole heat exchanger, the increasing-pressure endothermic process under action of the gravity field is taken into account. A temperature field and a velocity field are related and solved by coupling a mass, a momentum and energy equations. The densities of $CO_2$ and $CO_2$-based mixtures vary greatly with a temperature and pressure profile, resulting in variations of fluid flow velocities. The variations of fluid flow velocity affect a temperature via friction loss and Joule-Thomson cooling effect, so they all need to be considered in the simulation.

5. Flow Pressure Model of Downhole Heat Exchanger

A steady-state one-dimensional flow model is adopted here, and the mixture working fluid is regarded as a compressible fluid. Dimensions of the annulus, the inner pipe of the downhole heat exchanger, dimension of the well bore and other relevant dimensions are shown in Table 2. Simplified mass conservation and momentum conservation equations are as follows:

$$\frac{d}{dz}(\rho v) = 0 \tag{7}$$

$$\frac{d}{dz}(\rho v^2) = -\frac{dp}{dz} \pm \rho g \sin\theta - \frac{\tau_w \pi d}{A_P} \tag{8}$$

In the above expressions, p is a working fluid density, with a unit of $kg/m^3$; v is a flow velocity of a working fluid, with a unit of m/s; z is a coordinate of a flow path, with a unit of m; is an gravitational acceleration, with a unit of $m/s^2$; $\theta$ is an inclination angle of a flow direction; p is a pressure, with a unit of Pa; $\tau_w$ is a shear stress, with a unit of Pa; d is an equivalent diameter, with a unit of m; $A_P$, is a cross-sectional area. "+" represents a pressure change in the annulus where a flow direction is downward; and "−" represents a pressure change in the inner pipe and the wellbore where a flow direction is upward.

After substituting expression (7) into (8) and replacing a friction term, a fluid pressure expression can be expressed as:

$$\frac{dp}{dz} = \pm \rho g \sin\theta - \rho v \frac{dv}{dz} - f \frac{\rho v^2}{2d} \tag{9}$$

Darcy friction coefficient in the expression is usually determined based on experimental data. In this model, the friction coefficient is determined by the following correlations:

$$\begin{cases} f = \dfrac{64}{Re} & Re < 2300 \\ f = 0.06539 \times \exp\left(-\left(\dfrac{Re - 3516}{1248}\right)^2\right) & 2300 \leq Re \leq 3400 \\ \dfrac{1}{\sqrt{f}} = -2.34 \times \lg\left(\dfrac{\varepsilon}{1.72d} - \dfrac{9.26}{Re} \times & 3400 < Re < 2 \times 10^6 \\ \quad \lg\left(\left(\dfrac{\varepsilon}{29.36d}\right)^{0.95} + \left(\dfrac{18.35}{Re}\right)^{1.108}\right)\right) & \end{cases} \tag{10}$$

In the above correlations, Re is Reynolds number; and c is a roughness of a pipe wall.

6. Temperature Field Model of Dow hole Heat Exchanger

According to a basic principle of heat transfer, a heat conservation equation of the working fluid can be expressed as:

$$\frac{d}{dz}\left[\rho v\left(h + \frac{1}{2}v^2\right)\right] = -\frac{d}{dz}(\rho v) \pm \rho v g \sin\theta - \frac{q}{A_P} \tag{11}$$

Where h is a specific enthalpy of the working fluid, with a unit of $m^2/s^2$; q is a heat transferred between the working fluid and its surroundings per unit length, with a unit of J/(m·s). Similarly "+" represents an energy change in the annulus where a flow direction is downward; and "−" represents an energy change in the inner pipe and the wellbore where a flow direction is upwards.

Substituting the mass formula (7) into the energy conservation formula (11), the following expression can be obtained:

$$\frac{dh}{dz} = \pm g \sin\theta - v\frac{dv}{dz} - \frac{q}{w} \tag{12}$$

Where w is a mass flowrate of the working fluid, with a unit of kg/s.

The specific enthalpy h can be expressed as:

$$\frac{dh}{dz} = c_p \frac{dT}{dz} - \eta c_p \frac{dp}{dz} \tag{13}$$

Where $c_p$, is a specific heat capacity, with a unit of J/(kg,K); $\eta$ is Joule-Thomson coefficient, with a unit of K/MPa.

Substituting formula (13) into formula 2), the heat conservation equation can be further written as $$\frac{dT}{dz} = -\frac{q}{wc_p} + \frac{1}{c_p}\left(\eta c_p \frac{dp}{dz} \pm g\sin\theta - v\frac{dv}{dz}\right) \quad (14)$$

$$dp_{fr} = f\rho v^2/(2d) \cdot dz \quad (15)$$

represents heat generated by friction or viscous dissipation, and

Where $\dfrac{dp_{fr}}{c_p\rho dz} \quad \dfrac{1}{c_p\rho}\dfrac{dp}{dz}$ represents heat produced by fluid expansion or compression.

$$\eta\frac{dp}{dz}$$

represents heat produced by the Joule-Thomson effect.

7. Heat Transfer Model of Downhole Heat Exchanger

The heat transfer rate can be determined by the following formula:

$$q = \pi d U \Delta T \quad (16)$$

A convective heat transfer coefficient can be obtained by determining Nu number. Here, according to the existing reference, the following correlation is used:

$$Nu = 0.023 Re^{0.8} Pr^n \quad (17)$$

(a) Heat Transfer Between Inner Pipe and Annulus

A thermal insulation layer is provided between an inside wall of the inner pipe and an outside wall of the inner pipe, that is, a second layer is made of heat-insulating material, and a first layer and a third layer are made of common pipe wall materials. A total thermal resistance of heat transfer between the inner pipe and the annulus ($R_{ta}$), can be determined by:

$$R_{ta} = \frac{1}{2\pi r_{ti1}h_{ti}} + \frac{1}{2\pi\lambda_t}\ln\left(\frac{r_{to1}}{r_{ti1}}\right) + \\ \frac{1}{2\pi\lambda_{ins}}\ln\left(\frac{r_{ti2}}{r_{to1}}\right) + \frac{1}{2\pi\lambda_t}\ln\left(\frac{r_{to2}}{r_{ti2}}\right) + \frac{1}{2\pi r_{to2}h_{Ai}} \quad (18)$$

Where $r_{ti1}$ is an inner diameter of the inside wall of the inner pipe, with a unit of m; $r_{to1}$ is an outer radius of the outside wall of the inner pipe, with a unit of al; $h_{ti}$ is a convective heat transfer coefficient between the working fluid and an inner surface of the inner pipe, with a unit of W/(m²·° C.); λt is a thermal conductivity of the inside wall and the outside wall of the inner pipe, with a unit of W/(m²·° C.), $r_{ti2}$ is an inner radius of the outside wall of the inner pipe, with a unit of m; $\lambda_{ins}$ is a thermal conductivity of the insulating layer, with a unit of W/(m²·° C.); $h_{Ai}$ is a convective heat transfer coefficient between the working fluid and an inner surface of the annulus, with a unit of W/(m²·° C.).

The overall heat transfer coefficient between the inner pipe and the annulus can be determined as follows:

$$U_{ta} = \frac{1}{2\pi r_{to1}R_{ta}} \quad (19)$$

(b) Heat Transfer Between Annulus and Geothermal Fluid

The heat transfer between the annular flow and the geothermal fluid in the well can be determined by the following expression:

$$R_{aw} = \frac{1}{2\pi r_{ai}h_a} + \frac{1}{2\pi\lambda_t}\ln\left(\frac{r_{ao}}{r_{ai}}\right) + \frac{1}{2\pi r_{ao}h_w} \quad (20)$$

$$U_{aw} = \frac{1}{2\pi r_{ai}R_{aw}} \quad (21)$$

Where $R_{aw}$ is a total thermal resistance between the annulus and the geothermal fluid, with a unit of (m·° C.)/W; $U_{aw}$ is an overall heat transfer coefficient between the annulus and the geothermal fluid; $r_{ai}$ is an inner radius of the annulus, with a unit of m; $r_{ao}$ is an outer radius of the annulus, with a unit of in; ha is a convective heat transfer coefficient between the working fluid and an outer surface of the annulus, with a unit of W/(m²·° C.); $h_w$ is a convective heat transfer coefficient between the geothermal fluid and an outer surface of the outer pipe, with a unit of W/(m²·° C.).

(c) Heat Transfer Between Geothermal Fluid and Formation

The heat transfer between the formation and the wellbore is determined by the following formula:

$$Q = \frac{2\pi\lambda_e(T_{ei} - T_{wo})}{f(t)} \quad (22)$$

Where $\lambda_e$ is a thermal conductivity of the formation, in W/(m²·° C.); $T_{ei}$ is a formation temperature, in K; $T_{wo}$ is a temperature of an outside wall of the wellbore, in K; and f(t) is a dimensionless transient heat conduction function.

The transient heat conduction function is given by:

$$f(t) = [0.2352 + \ln(t_D + 0.6481)]\left(1 + \frac{0.0767}{t_D}\right) - \frac{0.0017 - \exp(-w)}{t_D} \quad (23)$$

Where $t_D$ is a dimensionless time.

To shorten the calculation time, the above expression can be simplified as follows:

$$f(t) = [0.2352 + \ln(t_D + 0.6481)] \quad (24)$$

After considering the heat transfer between the wellbore and the formation, the total thermal resistance ($R_w$ with a unit of (m·° C.)/W) between the geothermal water and the formation, and the corresponding overall heat transfer coefficient ($U_w$ with a unit of W/(m²·° C.)) can be determined as follows:

$$R_w = \frac{1}{2\pi r_{wi}h_w} + \frac{1}{2\pi\lambda_w}\ln\left(\frac{r_{wo}}{r_{wi}}\right) + \frac{f(t)}{2\pi\lambda_e} \quad (25)$$

-continued $$U_w = \frac{1}{2\pi r_{wo} R_w} \quad (26)$$

Where $r_{wi}$ is an inner radius of the wellbore, with a unit of m; $r_{wo}$ is an outer radius of the wellbore, with a unit of in.

8. Power Output and Thermal Efficiency

The power output and the thermal efficiency of the power cycle can be determined by:

$$W_{net} = W_T - W_P = (h_4 - h_5) - (h_2 - h_1) \quad (27)$$

$$\eta = W_{net}/Q_h = [(h_4 - h_5) - (h_2 - h_1)]/(h_4 - h_2) \quad (28)$$

Where $W_{net}$ is a net power output of the power cycle; $W_T$ is a power output of a turbine; $W_P$ is power consumption of a geothermal fluid injection pump; $h_1$, $h_2$, $h_4$, and $h_5$ are enthalpies of corresponding thermal states as shown in FIG. 3.

9. Downhole Heat Exchanger Model Solution Procedure

Governing equations and a heat transfer model are coupled for iterative calculation. In this study, the working fluid in the inner pipe and the annulus, as well as the geothermal fluid in the wellbore, are connected by heat transfer equations and the governing equations. Each flow channel is divided into multiple cells along a flow direction. The thermal properties and flow parameters keep constant in each cell. All the governing equations are converted into algebraic expressions in each cell. Through a series of integral iterative calculations, a temperature distribution and a pressure distribution of the fluids can be obtained.

All simulation calculations have been done using python, and the thermal properties of the mixture working fluid were obtained using REFPROP9.0.

Figure 4:
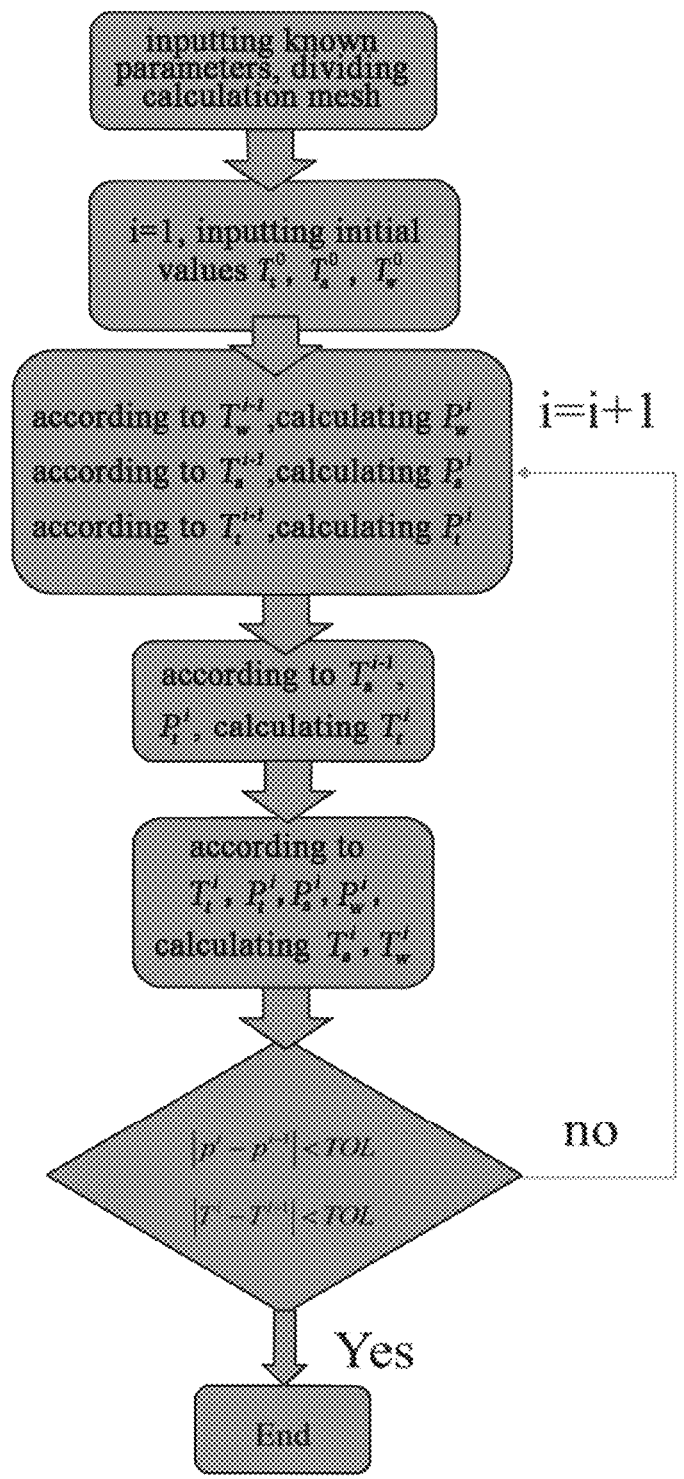
FIG. 4 is a flowchart illustrating a simulation procedure of flow and heat transfer of the downhole heat exchanger according to the present disclosure.

A flow chart of the simulation procedure is shown in FIG. 4. The fluid is divided into n segments along the flow direction, where a step length is set to helm.

Specific solution steps are as follows.

In step (1), the working fluids in the inner pipe and in the annulus, as well as the geothermal fluid in the wellbore are divided into n cells along a flow direction, and a position node is set as n.

In step (2), a temperature distribution of the working fluid in the inner pipe, a temperature distribution of the working fluid in the annulus, the temperature distribution of the geothermal water in the wellbore are all set as (N+1)×1 matrix.

In step (3), along the flow direction, the geothermal fluid pressure in each cell is calculated based on the temperature distribution and the flow pressure expression (9).

In step (4), for a given pressure at an inlet of the annulus, the pressure distribution in each cell in the annulus is calculated along a flow direction based on the temperature distribution and the flow pressure expression (9).

In step (5), according to a pressure distribution in the annulus, a pressure at an inlet of the inner pipe is obtained, and a pressure distribution in the inner pipe can then be determined via the same method as described in step (4).

in step (6), a new temperature distribution in the inner pipe can be calculated based on a heat transfer model, the temperature expression (14), and the pressure and temperature distributions of the working fluid and the geothermal fluid.

In step (7), based on the temperature distribution and the pressure distribution of the working fluid in the inner pipe and of the geothermal fluid, a new temperature distribution and a pressure distribution of the annular flow can be determined;

In step (8), a temperature distribution of the geothermal fluid is then obtained using the same method as for the mixture working fluid;

In step (9), steps (3)-(8) is repeated to obtain the temperature distribution and the pressure distribution until a difference between two adjacent steps is less than a predetermined error.

Specific Embodiments

A numerical simulation of the present disclosure adopts the Pattern search algorithm for optimization, by using the power output of the geothermal fluid per unit mass (hereinafter referred to as the specific power output) as an objective function, and using the mixing ratio of the mixture working fluid, the injection pressure of the working fluid and the mass flowrate of the working fluid in the downhole heat exchanger as independent variables. In the simulation, the mixing ratio of the mixture working fluid is in the range of 0.1-0.9, the injection pressure of the working fluid is in a range of 10 MPa-18 MPa, and the mass flowrate of the working fluid is in a range of 1 kg/s-10 kg/s. The simulation has considered two cases: i) where the geothermal fluid is at 120° C.; and ii) where the geothermal fluid is 180° C. The calculation results are shown in Table 3 and Table 4 respectively.

In addition, effects of the flowrate of the geothermal water, a length of the downhole heat exchanger and a type of the working fluid on the thermodynamic performance of the system are also calculated and analyzed.

TABLE 3

Optimization Results (geothermal fluid temperature = 120° C.).

| Mixture working fluid | Optimum mixing ratio | Optimum injection pressure (MPa) | Optimum working fluid flowrate (kg/s) | Maximum specific power output (W · h/kg) |
|---|---|---|---|---|
| R161/CO$_2$ | 0.12/0.88 | 13 | 6.6 | 5.46 |
| R32/CO$_2$ | 0.2/0.8 | 13 | 6.8 | 5.64 |
| R134a/CO$_2$ | 0.1/0.9 | 13.2 | 7.2 | 5.35 |
| R1270/CO$_2$ | 0.1/0.9 | 13.3 | 6.8 | 5.41 |
| R152a/CO$_2$ | 0.11/0.89 | 13.6 | 6.9 | 5.35 |
| R1234yf/CO$_2$ | 0.1/0.9 | 13 | 7.5 | 5.22 |
| R1234ze/CO$_2$ | 0.16/0.9 | 13.5 | 7.6 | 5.25 |

TABLE 4

Optimization Results (geothermal fluid temperature = 180° C.)

| Mixture working fluid | Optimum mixing ratio | Optimum injection pressure (MPa) | Optimum working fluid flowrate (kg/s) | Maximum specific power output (W · h/kg) |
|---|---|---|---|---|
| R161/CO$_2$ | 0.89/0.11 | 13 | 7.4 | 14.65 |
| R32/CO$_2$ | 0.9/0.1 | 12 | 7.9 | 16.28 |
| R134a/CO$_2$ | 0.1/0.9 | 18 | 9.8 | 13.37 |
| RI270/CO$_2$ | 0.9/0.1 | 13 | 6.4 | 13.57 |
| R152a/CO$_2$ | 0.1/0.9 | 18 | 9.4 | 13.52 |
| R1234yf/CO$_2$ | 0.1/0.9 | 18 | 8.1 | 11.82 |
| R1234ze/CO$_2$ | 0.1/0.9 | 18 | 8.2 | 12.05 |

Figure 5:
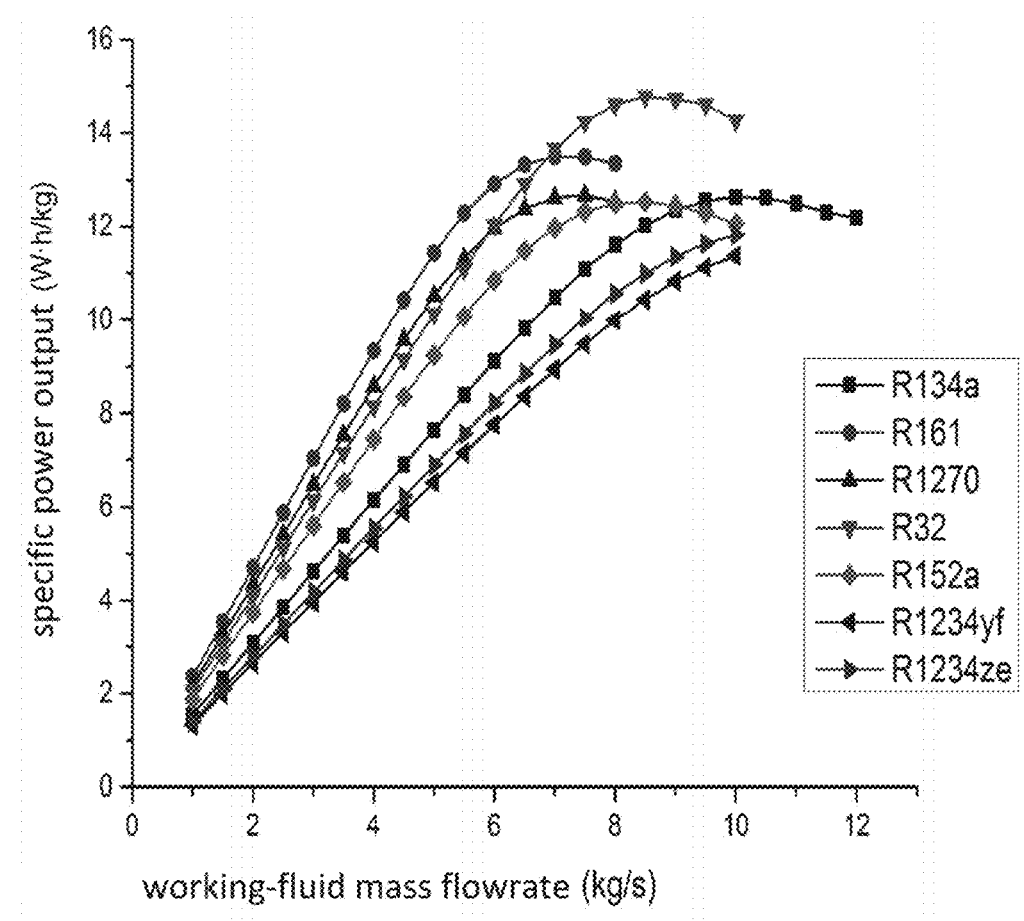
FIG. 5 is a diagram showing comparison results of power output per kg of geothermal fluid (specific power output) of the system when different $CO_2$-based binary mixture working fluids are used.

1. Comparative Analysis of Power Cycle Using Different CO$_2$-based Binary Mixture Working Fluids FIG. 5 shows a specific power output of a power cycle corresponding to use of 7 different CO$_2$-based binary working fluids with respect to a change of a mass flowrate of the working fluid. non-$CO_2$ components of each of the binary mixture working fluids are shown in the drawings. In the simulation, for all mixture working fluids, the mixing ratio of the non-$CO_2$ component to $CO_2$ is set to 0.5/0.5, the injection pressure of the working fluid is set to 14 MPa, the mass flowrate of the geothermal water is set to 5 kg/s, the mass flowrate of the geothermal fluid is 5 kg/s, the temperature of the geothermal fluid is 180° C., and the length of the heat exchanger is 300 m.

It can be seen from FIG. 5 that, for each working fluid, the system has a peak power output and an optimal working fluid flowrate corresponding to the peak power output. When the mass flowrate of the mixture working fluid R32/$CO_2$ is 8.5 kg/s, the specific power output of the power cycle reaches a maximum (15 Wh/kg), which is higher than the specific power outputs when other mixture working fluids are used in the system. When the working fluid R161/$CO_2$ is used and the mass flowrate is 6.5 kg/s, the specific power output of the system reaches a peak value (13.5 Wh/kg), second only to the specific power output for the working fluid R32/$CO_2$. Since the system generates more power when using R32/$CO_2$ and R161/$CO_2$ than using other mixture working fluids, these two working fluids are mainly analyzed in the following simulations.

2. Effect of Mixing Ratio of Mixture Working Fluid

Figure 6A:
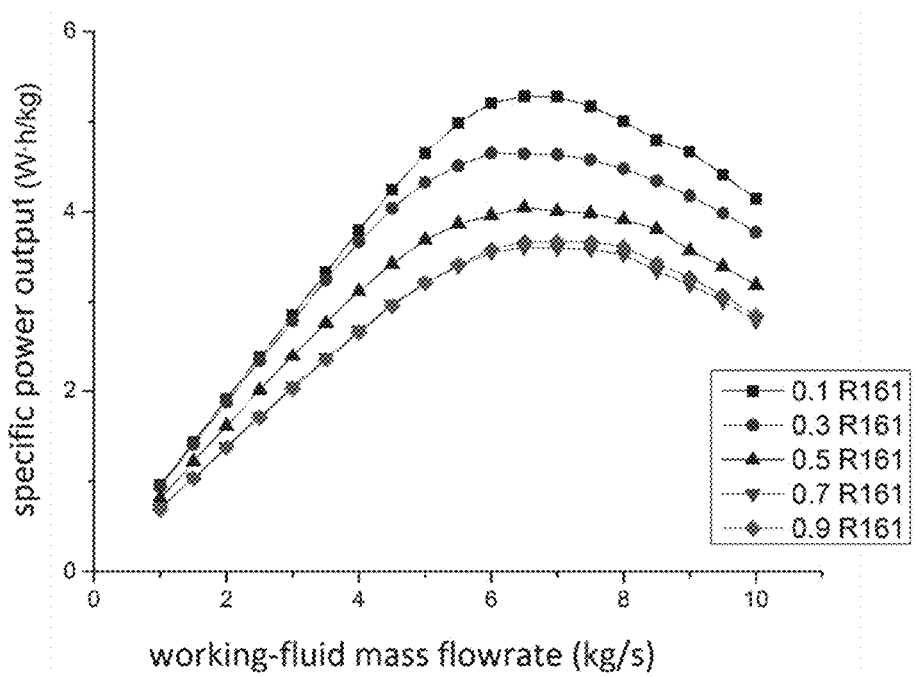
FIGS. 6A and 6B are curve diagrams showing effects of R161 mass fractions of working fluid R161/$CO_2$ on specific power output under different working fluid conditions; where in FIG. 6A, a temperature of geothermal water is 120° C., and in FIG. 6B, the temperature of the geothermal water is 180° C. (a mass flowrate of geothermal fluid=5 kg/s, a pressure at a mixture-working-fluid inlet of the downhole heat exchanger=141 MPa, a length of the downhole heat exchanger=300 m)
Figure 6B:
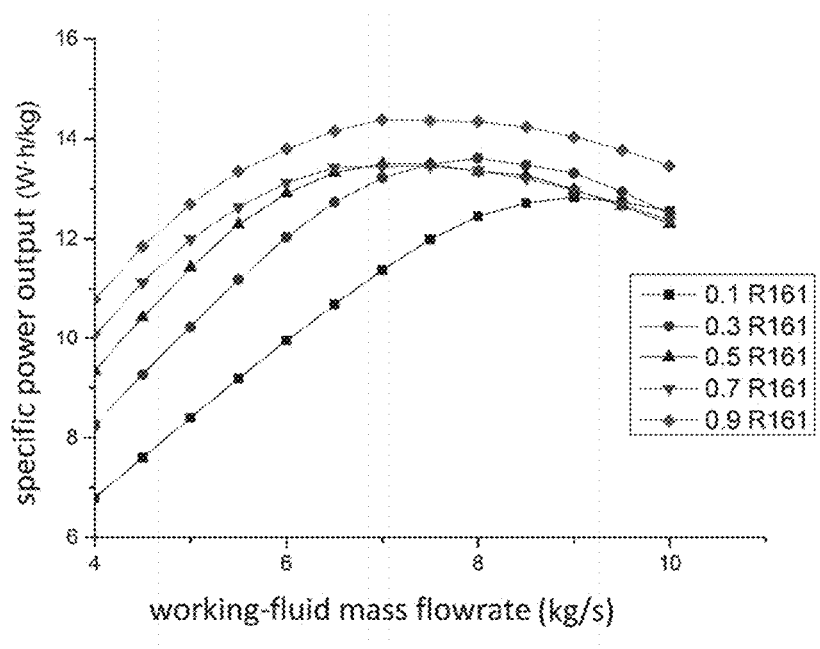

FIGS. 6 and 7 respectively show variations of the specific power outputs of the system with respect to the flowrate of the mixture working fluid under different mixing ratios of the mixture working fluids R161/$CO_2$ when the temperature of the geothermal fluid is 120° C. and such variations under different mixing ratios of the mixture working fluids R32/$CO_2$ when the temperature of the geothermal fluid is 180° C. Here, 5 different mixing ratios of mixture working fluids, i.e., 0.1, 0.3, 0.5, 0.7, 0.9, are investigated, and influence of the mixing ratio on the power output is analyzed. It can be seen in FIG. 6A that, when the temperature of the geothermal fluid is low (120° C.), the highest specific power output corresponds to a mass flowrate of the working fluid between 6 kg/s to 7 kg/s for all cases. When the temperature of the geothermal fluid is 180° C. (FIG. 6B), the optimal flowrate of the working fluid corresponding to the maximum power output shifts to the right (become larger), fall between 7 kg/s and 9 kg/s. When the mixture working fluid is R32/$CO_2$, the similar relationship between the maximum specific power output and the working fluid flowrate is shown in FIG. 7.

Figure 7A:
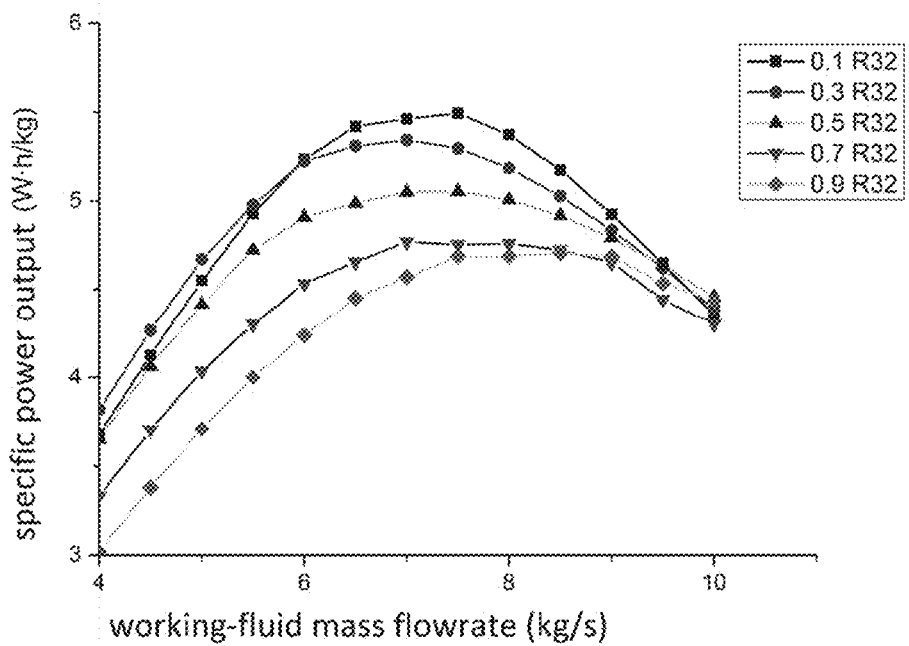
FIGS. 7A and 7B are curve diagrams showing effects of R161 mass fractions of working fluid R32/$CO_2$ on specific power output under different working fluid conditions, where in FIG. 7A, the geothermal water temperature is 120° C., and in FIG. 7B, the geothermal water temperature is 180° C. (a mass flowrate of geothermal fluid=5 kg/s, a pressure at a mixture-working-fluid inlet of the downhole heat exchanger=14 MPa, a length of the downhole heat exchanger=300 m)
Figure 7B:
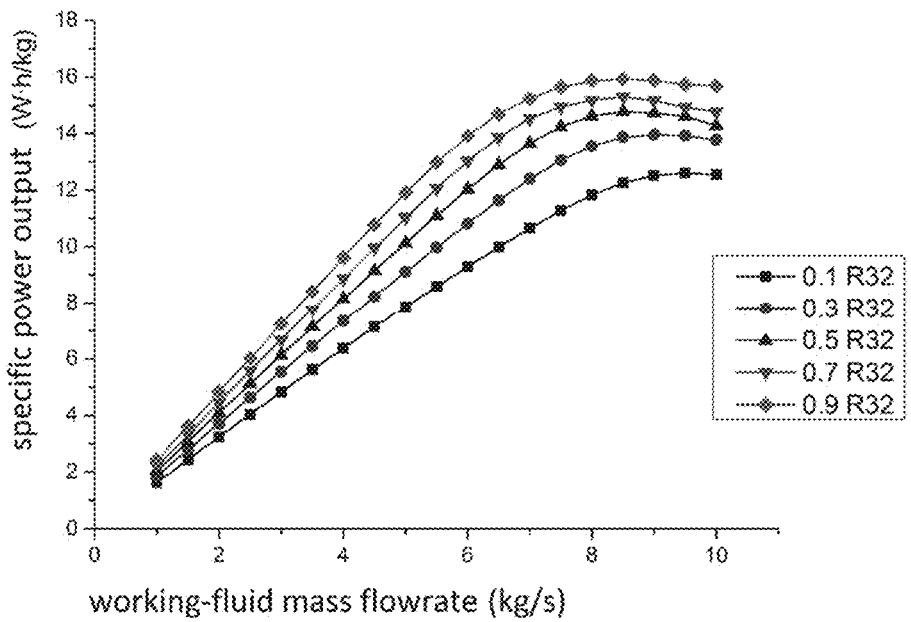

As can be seen in FIGS. 6A and 7A, no matter which of R161/$CO_2$ and R32/$CO_2$ is used, when the temperature of the geothermal water is lower (120° C.), the higher a proportion of $CO_2$ in the mixture working fluid is (that is, the lower ratio of R161/$CO_2$ to R32/$CO_2$), and the greater a specific power output is. When the temperature of the geothermal fluid is high (180° C.), as shown in FIG. 6B and FIG. 7B, the greater a proportion of $CO_2$ in the mixture is (that is, the less ratio of R161/$CO_2$ and R32/$CO_2$), the less a specific power output of the system is. This is mainly due to that the specific heat capacity is a strong function of a temperature. When the temperature of the geothermal fluid is 120° C., the average specific heat capacity of $CO_2$ is higher than that of R161 and R32, therefore, the greater a proportion of $CO_2$ is, the better a performance of the power cycle is. When the temperature of the geothermal fluid is 180° C., the average specific heat capacity of $CO_2$ is lower than that of R161 and R32, and therefore, there is an opposite relationship in FIGS. 6B and 7B. In this case, the smaller a proportion of $CO_2$ in the mixture working fluid is, the more the power output of the system is.

Setting parameters corresponding to the simulation results of FIG. 6 and FIG. 7 are as follows: geothermal fluid flowrate=5 kg/s, working fluid injection pressure=14 MPa, heat exchanger length-300 m.

3. Comparison of Performance of a Power Cycle when Different Working Fluids are Used.

FIG. 8 shows a specific power output comparison of a power cycle with respect to a working fluid flowrate. Four different working fluids (R32/$CO_2$, R161/$CO_2$, water and $CO_2$) are used. In the simulation, the geothermal fluid flowrate is set to 5 kg/s, and the heat exchanger length is 300 m. The injection pressures of R32/$CO_2$, R161/$CO_2$ and $CO_2$ are set to 14 MPa, and the injection pressure of water is set to 2 MPa, and a single flash power generation system is adopted.

Figure 8A:
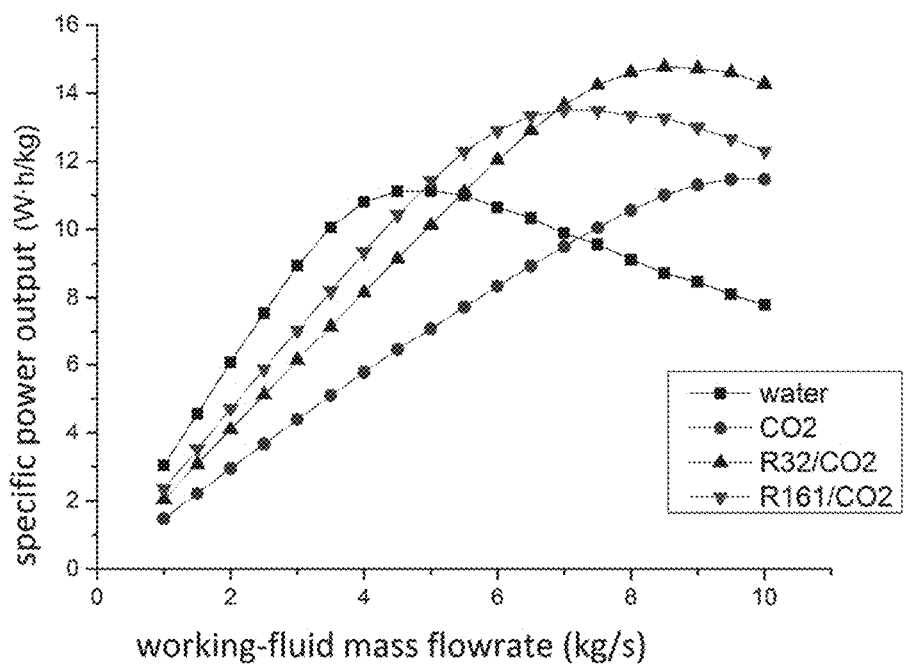
FIGS. 8A and 8B are curve diagrams showing comparison results of specific output power when different working fluids R32/$CO_2$, R161/$CO_2$, water and $CO_2$ are adopted in the present disclosure; where in FIG. 8A, the temperature of the geothermal fluid is 180° C., the mixing ratio of each mixture working fluid is 0.5/0.5, and in FIG. 8B, the temperature of the geothermal fluid is 120° C., and the mixing ratio of each mixture working fluid is 0.2/0.8 (a mass flowrate of geothermal fluid=5 kg/s, a pressure at a mixture-working-fluid inlet of the downhole heat exchanger=14 MPa, a length of the downhole heat exchanger=300 m).

When the temperature of the geothermal fluid is high (180° C.), as shown in FIG. 8A, the power cycle using R32/$CO_2$ and R161/$CO_2$ as the working fluids has a higher specific power output than that using water and $CO_2$. Among them when the working fluid R32/$CO_2$ is used, the power cycle has the highest specific power output, that is 15 Wh/kg, and the corresponding working fluid flowrate is 9 kg/s. When $CO_2$ or water is used as a power cycle working fluid, a maximum specific power output is only about 11 Wh/kg in each case. Therefore, it is significantly better to use the mixture working fluids R32/$CO_2$ or R161/$CO_2$ than to use water and $CO_2$.

Figure 8B:
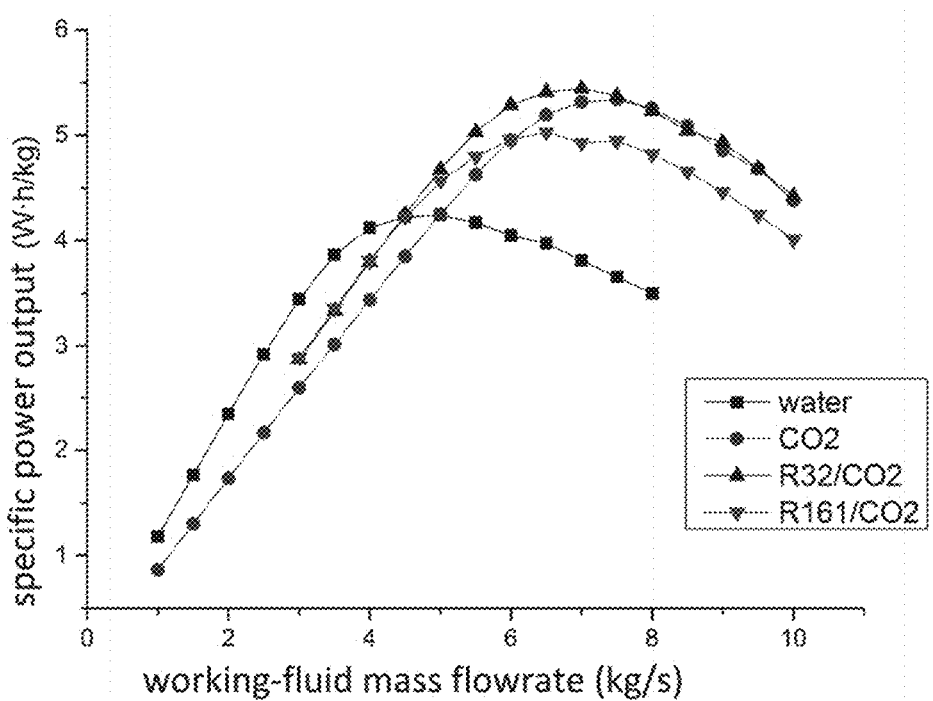

When the geothermal water temperature is low (120° C.), as shown in FIG. 8B, it is still better to use R32/$CO_2$ than to use the other three working fluids. Furthermore, the maximum specific power output when water is used as a working fluid is significantly lower than that when the other three working fluids are used.

Although the peak specific power output when $CO_2$ is used as a working fluid is higher than that when R161/$CO_2$ and water are used, a condensation process accompanied with phase change cannot be achieved when $CO_2$ is used as a working fluid, and hence the system cannot use a conventional condensing device, and a larger and more expensive cooling system has to be used, thereby resulting in more investment of a cooling device. Since the power cycle using R32/$CO_2$ as a working fluid has the highest specific power output at the two geothermal fluid temperatures of 120° C. and 180° C. R32/$CO_2$ is thus considered to be an optimum working fluid for the power generation system within the temperature range of the geothermal fluid investigated.

Although the embodiments and the accompanying drawings of the present disclosure are disclosed for illustrative purposes, those skilled in the art can understand that various substitutions, changes and modifications are possible without departing from the spirit and scope of the present disclosure and the appended claims. Therefore, the scope of the present disclosure is not limited to the content disclosed in the embodiments and the accompanying drawings.

What is claimed is:

1. A power generation model based on a transcritical cycle with an increasing-pressure endothermic process using $CO_2$-based mixture working fluids for an enhanced geothermal system, comprising a geothermal water circulation, a mixture working fluid circulation and a cooling water circulation, wherein a coaxial pipe-in-pipe downhole heat exchanger is provided in the mixture working fluid circulation; the mixture working fluid circulation adopts a binary mixture composed of $CO_2$ and an organic working fluid as a mixture working fluid, the mixture working fluid being selected from a group consisting of CO$_2$/R32, CO$_2$/R1270, CO$_2$/R161, CO$_2$/R1234yf, CO$_2$/R134a, CO$_2$/R152a, and CO$_2$/R1234ze; and wherein the power generation model comprises a geothermal production well, the coaxial pipe-in-pipe downhole heat exchanger, a turbine, a condenser, a working fluid pump, a geothermal water injection pump and a geothermal water reinjection well; the coaxial pipe-in-pipe heat exchanger is placed in the geothermal production well; an outlet of the coaxial pipe-in-pipe heat exchanger is connected to an inlet of the turbine; an outlet of the turbine is connected to an inlet of the condenser; an outlet of the condenser is connected to an inlet of the working fluid pump; an outlet of the working fluid pump is connected to an inlet of the coaxial pipe-in-pipe heat exchanger; an outlet of the geothermal production well is connected to an inlet of the geothermal water injection pump; an outlet of the geothermal water injection pump is connected to an inlet of the geothermal water reinjection well.

2. The power generation model according to claim 1, wherein a mixing ratio of the mixture working fluid is within a range of 0.1 to 0.9; an injection pressure of the mixture working fluid is within a range of 10 MPa to 18 MPa; a mass flowrate of the mixture working fluid is within a range of 1 kg/s to 10 kg/s.

3. The power generation model according to claim 1, wherein the inlet of the condenser comprises a mixture working fluid inlet and a cooling water inlet, the outlet of the condenser comprises a mixture working fluid outlet and a cooling water outlet; the outlet of the turbine is connected to the mixture working fluid inlet of the condenser, the mixture working fluid outlet of the condenser is connected to the inlet of the working fluid pump.

4. The power generation model according to claim 1, wherein the condenser is connected to an external cooling device.

5. The power generation model according to claim 3, wherein the condenser is connected to an external cooling device.

6. The power generation model according to claim 4, wherein the cooling device is a cooling tower.

7. The power generation model according to claim 5, wherein the cooling device is a cooling tower.

\* \* \* \* \*